Feb. 11, 1930.    C. L. ANDERSON    1,746,980
UNIVERSAL JOINT
Filed Oct. 22, 1925
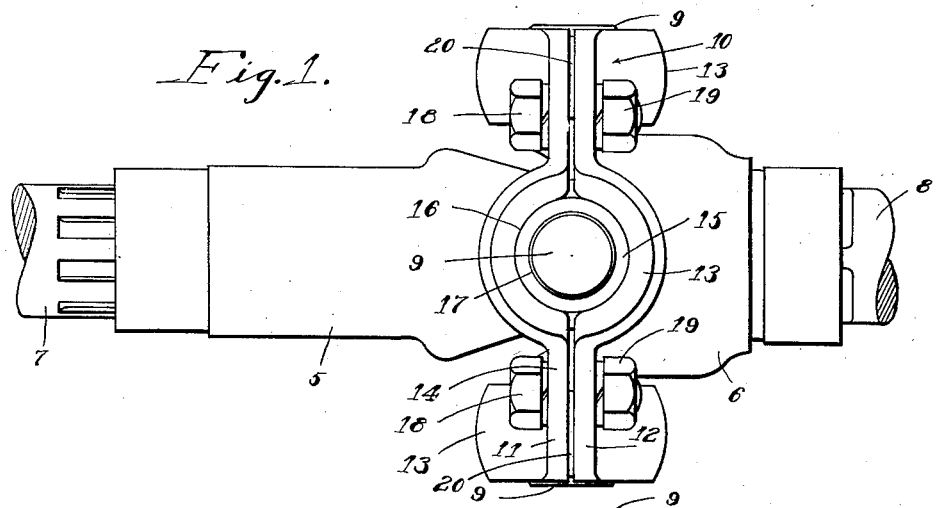
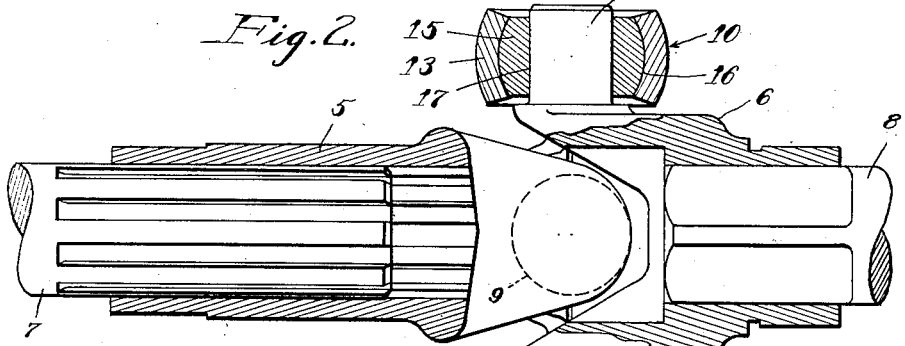
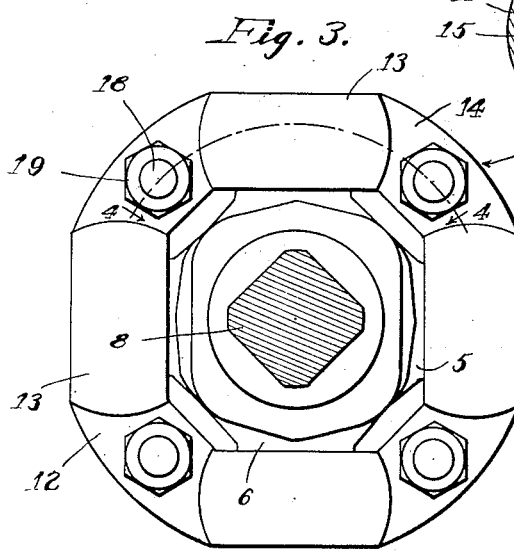
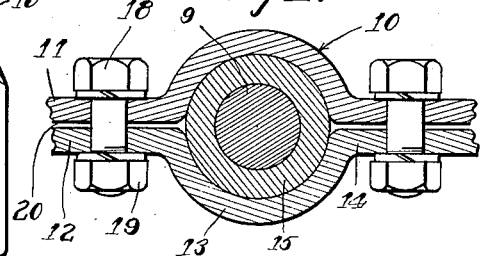
Inventor
Carl L. Anderson
By Wilson & McCanna
Attys.

Patented Feb. 11, 1930

1,746,980

UNITED STATES PATENT OFFICE

CARL L. ANDERSON, OF ROCKFORD, ILLINOIS, ASSIGNOR, BY DIRECT AND MESNE ASSIGNMENTS, TO MECHANICS UNIVERSAL JOINT COMPANY, OF ROCKFORD, ILLINOIS, A CORPORATION OF ILLINOIS

UNIVERSAL JOINT

Application filed October 22, 1925. Serial No. 64,084.

This invention relates to universal joints of the so-called trunnion type particularly designed and intended for motor vehicle propeller shafts, but capable of general application to coupling driving and driven elements in any power transmission.

The principal object of the invention is to provide a cheap and serviceable joint for the purpose referred to, which is characterized mainly by the provision of selfaligning trunnion bearings which enable the use, but not essentially, of stamped transmission rings for retaining the bearings irrespective of what slight inaccuracies would otherwise be introduced by this character of manufacture.

Heretofore it has been common practice in manufacturing universal joints of the kind that the present invention is designed to replace, to bore the bearing holes directly in the rings. This necessitated careful work in order to get good bearing surfaces and rendered it impossible to have hardened surfaces for the trunnion journals to operate in. In the event that hardened bushings are inserted accuracy is required to insure such precise location of the bushings as to give comparatively full bearing for the trunnions. In the present construction the members or bearing blocks having spherical exterior form for self-aligning in the stamped transmission rings may be hardened readily and polished in the bore to give the desired long-lifed bearing.

The savings resulting in the present construction by the reduced amount of machine work involved, are further increased by the facility with which the joint may be assembled. The self-alignment of the bearings makes the assembling operation practically fool-proof.

Other objects and attendant advantages will be appreciated by those familiar with this art as the invention becomes better understood by reference to the following description when read in connection with the accompanying drawing, wherein—

Fig. 1 is a side view of a universal joint embodying my invention;

Fig. 2 is a central longitudinal section;

Fig. 3 is an end view; and

Fig. 4 is a sectional detail taken on the arcuate line 4—4 of Fig. 3 looking in the direction of the arrows.

The same reference numerals are applied to corresponding parts in the four views.

The terminal coupling members designated generally by the numerals 5 and 6 connect respectively with the shafts 7 and 8, either of which might be the driving or the driven shaft. The members 5 and 6 may be of any suitable or preferred construction and in the present case are of the well known trunnion type, terminating at one end in a pair of opposed co-axial trunnions 9. These shafts 7 and 8 are maintained in determined relative relation by bearings not shown. The present invention relates to improvements in an intermediate transmission member designated generally by the reference numeral 10 for interconnecting the trunnions of the coupling members.

The transmission member 10 is of the ring type and comprises in the preferred embodiment, a pair of juxtaposed stamped sheet metal rings 11 and 12 struck to provide quarteringly disposed semi-spherical sockets 13 with intermediate connecting webs 14. The sockets 13 are arranged so as to register to provide recesses between the rings for the reception of bearing members 15. The latter are machined to have a spherical exterior surface, as indicated at 16, and are centrally bored, as indicated at 17, for reception of and bearing on the trunnions 9 of the coupling members. The bearing members 15 are preferably of steel and suitably hardened to give the desired long-lifed bearing surfaces for the trunnioned coupling members. The spherical exterior surface 16 of the bearing members serves to make said members self-aligning with respect to the trunnions 9 and the sockets 13, irrespective of whatever slight inaccuracies may have been introduced because of the character of manufacture of the rings 11 and 12, the bearing members, the coupling members, or any of them. It is contemplated that the rings shall not require any subsequent machining of bearing sockets after they are formed in the dies but that the desired alignment will be afforded by this construction of the bearings. The rings 11 and 12 are assembled by a series of bolts 18 entered through the webs 14 between the sockets 13. Nuts 19 are threaded on the bolts 18 and lock washers are preferably interposed to guard against loosening in service. A slight clearance is provided for between the rings at the webs, as indicated at 20, so that the bearing members 15 may be clamped rigidly in position. A sheet metal shell and socket are preferably provided to enclose the joint and retain a quantity of grease or other lubricant to give easy running and minimize the wearing of the joint.

From the foregoing description it will be seen that I have provided a universal joint of a very practical and durable character and one which may be manufactured and assembled at a relatively small cost. Since the construction enables the use of stamped parts as I have described, a considerable saving in cost is effected, although my invention is not confined to the use of stamped parts. At the same time the provision of the self-aligning bearings that enables this type of construction results in minimum wear and generally improved operating efficiency. Furthermore, this type of bearing greatly facilitates the assembling operations and is a considerable factor in reducing the cost of production. It makes the assembling of the joint practically fool-proof. Machining operations that gave rise to considerable cost in production are reduced to a minimum by the present construction without sacrificing nicety of fit between the parts and the long service and increased efficiency that flow therefrom.

I claim:

1. In a universal joint, the combination of a pair of trunnioned coupling members, an intermediate transmission member comprising a pair of stamped rings providing relatively rough and unfinished spherical-shaped sockets therebetween, means for securing said rings together, and spherical bearing members providing finished bearings therein for swiveling on the trunnions of said coupling members, said bearing members being received in the sockets provided in said transmission member and being arranged to be clamped therein in their self-assumed positions.

2. In a universal joint of the character described, a transmission ring of stamped sheet metal having quarteringly disposed semi-spherical sockets struck therein, and intermediate connecting webs between said sockets.

3. A universal joint, comprising a pair of coupling members each terminating in a pair of opposed coaxial trunnions, a pair of ring stampings each having quarteringly spaced spherical sockets struck in one side, a bearing member for each trunnion having a spherical exterior surface, said parts adapted to be assembled with the bearing members positioned on the trunnions and disposed in the spherical sockets of opposed rings, and means for clamping said rings together to secure them and the bearing members in fixed relative relation.

4. In a universal joint of the trunnion type, a transmission means comprising a pair of stamped ring members having quarteringly disposed semi-spherical sockets struck therein, trunnion bearing members adapted for universal positioning in said sockets intermediate said ring members, and fastening means for clamping the ring members to the bearing members.

In witness of the foregoing I affix my signature.

CARL L. ANDERSON.